United States Patent Office

3,443,986
Patented May 13, 1969

3,443,986
PROCESS FOR IMPROVING THE ADHESION OF FIBROUS MATERIALS TO RUBBER
Jun Watanabe, Soji Arakawa, and Tokuji Fukuoka, Uji-shi, Japan, assignors to Nippon Rayon Co., Ltd., Kyoto-fu, Japan, a corporation of Japan
No Drawing. Filed Aug. 24, 1964, Ser. No. 391,783
Int. Cl. B32b 25/02; D06m 13/14, 13/16
U.S. Cl. 117—138.8                   2 Claims

ABSTRACT OF THE DISCLOSURE

A process for the adhesion of fibrous materials to rubber by dipping the fibrous materials in a mixture of a wax and/or paraffin containing resorcinol, formalin and a rubber latex so as to improve adhesive strength of the fibrous materials.

---

This invention relates to the adhesion of fibrous materials to rubber. More particularly it concerns the coating of cords with improved compositions.

Synthetic fibers or cord such as rayon and nylon have adhered very poorly to rubber when they were united and cured. Several developments have been made in this respect. One of those is to coat synthetic fibers or cords with a phenolic aldehyde resin containing latex. The phenolic aldehyde resin is commonly made from resorcinol, formaldehyde and alkali such as sodium hydroxide which act as the catalyst of the resinification or pH adjuster. Adhesive force of the cord coating is appreciably high if it is united and cured to rubber just after the treatment. The force however, descreases when the treated cord is laid in normal atomsphere. Only a lapse of a few days makes it impossible to use practical purposes.

This invention provides an improved method for coating synthetic cords. According to the invention, the aforementioned disadvantage may be remarkably reduced and the treated cord maintains a strong adhesive force for a long time.

Adhesions of cords to rubber are measured by H-test techniques described of ASTM No. D 2138-62 T. If a cord having 840 denier-2 ply is treated by a conventional dip indispersions of resorcinol, aldehyde and latex, and if it is immediately vulcanized with rubber the adhesive H-force is as high as 10 kg. If it is vulcanized with rubber, after 360 hours from the dip treatment, the force decreases to about 4 kg. According to the present invention, the former force not only shows 10 kg. but the latter retains 8 kg.

The preferred composition in the present invention comprises phenolic aldehyde resins, rubber latices and waxes and/or paraffins which melt above 40° C. In the preparation of the dip dispersions, any prior art method may be applied, for example, rubber latices are mixed with a phenolic aldehyde resinous solution containing catalytic alkali and then added into a dispersion of waxes and/or paraffins.

Rubber latex in the present invention may be either natural rubbers or synthetic rubbers. Any of waxes or paraffins, for example, natural waxes such as whale wax, pappy wax, honey wax, and chinese wax and synthetic waxes such as n-octadecyl palmitate and cetyl stearate may preferably be applied. Waxes or paraffins of melting points below 40° C. also have some aforementioned advantage but coated fibers or cords with such compositions are difficult to handle because of the fluidity of these compounds at normal atmosphere.

Preferred amount of waxes or paraffins may range from 0.03 to 1.0 percent by weight with reference to the cord weight. If the amount is too small, there will be no signficant effect. If it is too large, it is no more than waste.

The mechanism for preventing the reduction of the adhesion with lapse of time by the addition of these compounds is not obvious.

The invention will be better understood from the following examples but it is not limited by the examples.

Example 1

Dip dispersions were prepared according to the following procedure:

Resorcinol-formaldehyde solution (liquid A) of the following formulation was prepared and aged for 6 hours.

A

| | Parts by weight |
|---|---|
| Water | 238.4 |
| Sodium hydroxide | 0.3 |
| Resorcinol | 11.0 |
| Formalin (37% aq. solu.) | 16.2 |

Then it was mixed with latex (B liquid) as follows:

B

| | Parts by weight |
|---|---|
| Water | 61.1 |
| Latex (40% solids content) | 224.6 |
| Liquid A | 265.9 |

The liquid B was an original dip liquid.

Another liquid C was prepared by adding a suspension of a wax having a melting point of 80° C. dispersed with a metallic soap and a viscosity increasing agent by a homogenizer to the liquid B. The amount of wax was 2.5 percent by weight of liquid B.

Nylon 6 cord of 2-ply yarns of 840 den./140f of 47 x 47 twists/10 cm. was dipped in either the liquid B or C, and dried at 185° C. for 30 seconds while being hot stretched by 8%. The treated cords wre vulcanized in the rubber after a while under normal atmospheric conditions.

The adhesive force was then measured by H-test.
The results are shown in the following table:

ADHESIVE FORCE (IN KG.)

| Kinds of liquid | Lapse of time from dipping to vulcanizing hours | | | | | |
|---|---|---|---|---|---|---|
| | 0 | 24 | 72 | 120 | 216 | 360 |
| B | 10.1 | 8.4 | 7.0 | 6.0 | 4.9 | 3.7 |
| C | 11.6 | 10.9 | 10.0 | 9.9 | 8.3 | 7.9 |

It is seen from the above table that the cord dipped in the liquid C has the powerful effect of preventing the reduction of the adhesion after a lapse of days.

The amount of the wax pick up was 0.72% by weight with reference to the cord weight.

Example 2

Dipping liquid D was prepared by adding a dispersion of a solid paraffin having a melting point of 55° C. dispersed with a nonionic surfactant to liquid B of Example 1 by means of a homogenizer.

The same cord described in Example 1 was dipped in either the liquid B or D, and hot stretched. A similar adhesion test in Example 1 was made. The results are shown in the following table:

ADHESIVE FORCE (IN KG.)

| Kinds of liquid | Lapse of time from dipping to vulcanizing hours | | | | | |
|---|---|---|---|---|---|---|
| | 0 | 24 | 72 | 120 | 216 | 360 |
| B | 11.6 | 9.9 | 8.4 | 8.4 | 6.9 | 3.7 |
| D | 11.2 | 10.1 | 10.1 | 10.4 | 9.2 | 8.4 |

From the table, it is obvious that the cord treated with the liquid D maintains high adhesive forces.

The amount of deposition of paraffin was 0.68% by weight with reference to of the cord weight.

What we claim is:

1. A process for treating rayon and nylon fibrous materials for improving their adhesion to rubber prior to vulcanization thereof which comprises treating said fibrous materials with a composition containing resorcinol, formalin, rubber latex and a wax-like substance selected from the group consisting of paraffins and waxes which melt above 40° C., pappy wax, honey wax, chinese wax, N-octadecyl palmitate and cetyl stearate for preparing said fibrous material for adherence to said rubber, said treatment enhancing said adherence after said vulcanization.

2. A process according to claim 1, wherein said fibrous material accumulates at least 0.03% by weight of said wax-like substance in the course of said treating step.

References Cited

UNITED STATES PATENTS

| | | | |
|---|---|---|---|
| 2,671,042 | 3/1954 | Stokes. | |
| 2,739,091 | 3/1956 | Engstrom et al. | 161—235 X |
| 2,964,470 | 12/1960 | Wentworth | 161—235 X |
| 2,238,165 | 4/1941 | Ellis et al. | 260—745 |
| 2,541,689 | 2/1951 | Carson | 161—234 |
| 3,135,624 | 6/1964 | Nakane et al. | 156—335 |
| 3,194,294 | 7/1965 | Van Gils | 156—335 |
| 3,242,118 | 3/1966 | St. Clair | 156—335 |
| 3,300,426 | 1/1967 | Hunsucker | 260—29.3 |

OTHER REFERENCES

Grant, J., "Hackh's Chemical Dictionary," 3rd ed. 1944, McGraw-Hill Book Co., New York City, p. 906.

Further citations in Hackh's Chemical Dictionary edited by Grant, McGraw-Hill, 3rd ed. 1944, New York City, pp. 190, 743, 847.

EARL M. BERGERT, *Primary Examiner.*

C. B. COSBY, *Assistant Examiner.*

U.S. Cl. X.R.

117—144, 145, 146, 161, 163, 168; 156—110, 335, 338; 161—234, 235, 241